United States Patent
Hashigaya (10) Patent No.: US 6,633,752 B1
(45) Date of Patent: Oct. 14, 2003

(54) BASE BAND SIGNAL OFFSET CORRECTING CIRCUIT FOR FSK RECEIVING APPARATUS AND METHOD THEREOF

(75) Inventor: Atsuhiko Hashigaya, Kanakawa (JP)

(73) Assignee: Matsushita Electric Industries Co., Ltd., Osaka (JP)

( * ) Notice: Subject to any disclaimer, the term of this patent is extended or adjusted under 35 U.S.C. 154(b) by 384 days.

(21) Appl. No.: 09/585,954

(22) Filed: Jun. 2, 2000

(30) Foreign Application Priority Data

Jun. 3, 1999 (JP) .......................................... 11-156769

(51) Int. Cl.[7] ................................................ H04B 1/10
(52) U.S. Cl. ........................ 455/296; 455/206; 455/208; 455/214; 455/296; 455/337; 375/324; 375/329; 375/317; 375/334
(58) Field of Search ................................ 455/296, 206, 455/208, 214, 337; 375/324, 329, 317–319, 334, 346

(56) References Cited

U.S. PATENT DOCUMENTS

| 4,575,683 A | * | 3/1986 | Roberts et al. ............... 327/78 |
| 5,140,699 A | * | 8/1992 | Kozak ..................... 455/278.1 |
| 5,281,968 A | * | 1/1994 | Iwanaga |
| 5,394,109 A | * | 2/1995 | Simard ....................... 329/300 |
| 5,422,889 A | * | 6/1995 | Sevenhans et al. .......... 370/442 |
| 5,508,656 A | * | 4/1996 | Jaffard et al. ................ 330/259 |
| 5,699,011 A | * | 12/1997 | Sgrignoli ..................... 329/350 |
| 5,754,595 A | * | 5/1998 | Honkasalo (nee Zhu) et al. .......... 375/286 |
| 5,999,577 A | * | 12/1999 | Kawai ......................... 329/300 |
| 6,038,268 A | * | 3/2000 | Kawai ......................... 329/300 |
| 6,058,150 A | * | 5/2000 | Ghosh ......................... 370/514 |
| 6,175,728 B1 | * | 1/2001 | Mitama ...................... 375/319 |
| 6,324,231 B1 | * | 11/2001 | Huang |
| 6,353,641 B2 | * | 3/2002 | Macq et al. ................. 375/319 |
| 6,400,778 B1 | * | 6/2002 | Matui .......................... 327/238 |

* cited by examiner

Primary Examiner—William Trost
Assistant Examiner—Stephen D'Agosta
(74) Attorney, Agent, or Firm—Pearne & Gordon LLP (57) ABSTRACT

An FSK receiving apparatus has, as means for performing offset correction upon a demodulated base band signal, a second low pass filter 9 for integrating the demodulated base band signal; a window comparator for detecting a DC offset component in an output voltage from the second low pass filter 9; an up/down counter 11 for incrementing or decrementing a count value on the basis of the output of the window comparator 10; a clock generating portion 13 for generating a timing signal for counting operation in the up/down counter 11; a reference voltage generating portion 12 for generating a reference voltage for a comparator 7 on the basis of the output of the up/down counter 11; and a charging circuit 22 for supplying a reference voltage in the last frame to the second low pass filter 9 so as to charge the second low pass filter 9 with the last-frame reference voltage and set an initial value of the second low pass filter 9.

3 Claims, 6 Drawing Sheets

BASE BAND SIGNAL OFFSET CORRECTING CIRCUIT FOR FSK RECEIVING APPARATUS AND METHOD THEREOF

BACKGROUND OF THE INVENTION

1. Field of the Invention

The present invention relates to a circuit for use in an FSK (Frequency Shift Keying) receiving apparatus such as a pager or the like for receiving a modulated signal (hereinafter referred to as FSK signal) obtained by FSK, and particularly relates to a base band signal offset correcting circuit for automatically correcting a DC offset of a demodulated base band signal, a method therefor, and an FSK receiving apparatus with such a correcting circuit.

2. Description of the Related Art

An FSK system is a method of transmitting a digital signal through frequency transition of a carrier. To demodulate an FSK signal in a receiving apparatus, there is adopted a method in which an output voltage of a frequency discriminating circuit obtained on the basis of the received FSK signal is compared with a reference voltage to perform signal judgement to thereby obtain a demodulated digital signal. In the FSK system, when there is generated a carrier frequency error on the transmission side, a frequency error of a frequency converting local oscillator on the receiving side, an error of a center frequency of the frequency discriminating circuit, or the like, such an error appears as a DC offset of the demodulated base band signal. This DC offset component becomes equivalent to a deviation in the reference voltage when signal judgement is performed on the demodulated base band signal. Thus, the DC offset component results in deterioration in the demodulation characteristic in the receiving apparatus. Particularly, when a multi-valued modulated signal such as a four-values FSK signal or the like is received, it is necessary to provide a plurality of reference voltages close to each other. It is therefore necessary to detect the above-mentioned DC offset component with high precision and correct it.

To correct such an error as described above, there are a method of correcting an input frequency error in the frequency discriminating circuit and a method of directly correcting the DC offset with the demodulated base band signal itself. If there is room in a bandwidth of an intermediate frequency band, the method of correcting the DC offset only with the demodulated base band signal is more advantageous in that the circuit configuration can be made simply. Thus, there have been considered various methods for detecting a DC offset of a demodulated base band signal in a base band so as to correct a reference voltage. Examples of the methods include: (a) a method in which upper and lower limit values of a demodulated base band signal are detected and a DC component is detected from an average value of those limit values; (b) a method in which a modulated base band signal and an output signal of a signal judging comparator are trued up in their amplitudes and a difference between those signals is integrated so that a DC component is detected; (c) a method in which a demodulated base band signal is integrated so that a DC component is detected; and so on.

Of the above-mentioned correcting methods, in the method (a), an error may occur easily due to noise in the detection of the upper and lower limit values. On the other hand, the methods (b) and (c) have an advantage that the influence of noise can be reduced by integration. Particularly, in the method (c), the circuit configuration is simplest because it will go well if only an integrating circuit is provided as a correcting circuit. When a correcting circuit is configured by use of the method (c), an output voltage of the integrating circuit is used as a reference voltage of a comparator so as to correct a DC offset. It is, however, necessary to increase a time constant of the integrating circuit in order to detect the DC offset component with high precision, so that the convergence time of the output voltage is elongated. As a result, it takes a long preheating time (readiness period of time) for the circuit to run. In addition, there is a problem that receiving operation cannot be started because divergence appears in the reference voltage till the integration has been finished and the output voltage has converged.

As mentioned above, in the base band signal offset correcting circuit in the background-art FSK receiving apparatus, there is a problem that it is impossible to deal with high-speed operation because it is necessary to increase the time constant of the integrating circuit in order to detect a DC offset component with high precision. A time division multiple access (TDMA) system is adopted widely in digital mobile communication. Since burst reception is performed for receiving a signal intermittently in communication based on this TDMA system, a high-speed property is required in the correcting circuit.

SUMMARY OF THE INVENTION

The present invention has been developed in consideration of the foregoing situation. It is an object of the present invention to provide a base band signal offset correcting circuit and a method therefor, in which it is possible to detect a DC offset component of a demodulated base band signal easily with high precision and at a high speed, and it is possible to perform correction at a high speed and with high precision. It is another object to provide an FSK receiving apparatus with such a correcting circuit.

According to one aspect of the present invention, there is provided a base band signal offset correcting circuit for correcting a DC offset of a demodulated base band signal which is obtained by demodulating an FSK signal, comprising: an integrating circuit for integrating said demodulated base band signal; offset detecting means for judging whether an output of said integrating circuit is or not within a predetermined range to thereby detect a DC offset component of said demodulated base band signal; counting means for incrementing or decrementing an output of said offset detecting means at predetermined timing to thereby update a count value of said counting means; reference voltage generating means for generating a reference voltage on the basis of said count value, said reference voltage being used in a comparator to perform signal judgement upon said demodulated base band signal; and initial integral value setting means for supplying said reference voltage generated the last time to said integrating circuit to thereby set said reference voltage as an initial output value of said integrating circuit.

According to further aspect of this invention, the base band signal offset correcting circuit, further comprises: frequency error judging means for comparing said count value of said counting means with a reference value to thereby detect a frequency error of said FSK signal; second counting means for incrementing or decrementing an output of said frequency error judging means at predetermined timing to thereby update a count value of said second counting means; and local oscillation frequency control means for controlling an oscillation frequency of a local oscillator in accordance with said count value of said second counting means.

According to another aspect of this invention, there is provided an FSK receiving apparatus with a base band signal offset correcting circuit for correcting a DC offset of a demodulated base band signal which is obtained by demodulating an FSK signal, comprising: integrating circuit for integrating the demodulated base band signal; offset detecting means for judging whether an output of the integrating circuit is or not within a predetermined range to thereby detect a DC offset component of the demodulated base band signal; counting means for incrementing or decrementing an output of the offset detecting means at predetermined timing to thereby update a count value of the counting means;

reference voltage generating means for generating a reference voltage on the basis of the count value, the reference voltage being used in a comparator to perform signal judgement upon the demodulated base band signal; and initial integral value setting means for supplying the reference voltage generated the last time to the integrating circuit to thereby set the reference voltage as an initial output value of the integrating circuit.

According to yet another aspect of this invention, in the FSK receiving apparatus, the base band signal offset correcting circuit comprising: frequency error judging means for comparing the count value of the counting means with a reference value to thereby detect a frequency error of the FSK signal; second counting means for incrementing or decrementing an output of the frequency error judging means at predetermined timing to thereby update a count value of the second counting means; and local oscillation frequency control means for controlling an oscillation frequency of a local oscillator in accordance with the count value of the second counting means.

In still further aspect of the present invention, there is provided a base band signal offset correcting method for correcting a DC offset of a demodulated base band signal which is obtained by demodulating an FSK signal, comprising: an integrating step for integrating the demodulated base band signal; an offset detecting step for judging whether an integral value of the demodulated base band signal is or not within a predetermined range to thereby detect a DC offset component of the demodulated base band signal; a counting step for incrementing or decrementing the DC offset component at predetermined timing to thereby update a count value; a reference voltage generating step for generating a reference voltage on the basis of the count value, the reference voltage being used in a comparator to perform signal judgement upon the demodulated base band signal; and an initial integral value setting step for supplying the reference voltage generated the last time to an integrating circuit for carrying out the integrating step to thereby set the reference voltage as an initial output value of the integrating circuit.

In still further aspect of this invention, the base band signal offset correcting method comprises: a frequency error judging step for comparing the count value in the counting step with a reference value to thereby detect a frequency error of the FSK signal; a second counting step for incrementing or decrementing the detected frequency error at predetermined timing to thereby update a count value; and a local oscillation frequency control step for controlling an oscillation frequency of a local oscillator in accordance with the count value in the second counting step.

In the base band signal offset correcting circuit, in the method therefor and in the FSK receiving apparatus with the correcting circuit according to the present invention, a demodulated base band signal is integrated by an integrating circuit, and it is judged whether an integrated value of the demodulated base band signal is or not within a predetermined range, so that a DC offset component of the demodulated base band signal is detected.

Then, the output of the offset detecting means is incremented or decremented at predetermined timing in the counting means so that a count value is updated. A reference voltage for a comparator for performing signal judgement upon the demodulated base band signal is generated by reference voltage generating means, on the basis of the count value. Then, the reference voltage generated the last time is supplied to the integrating circuit through initial integral value setting means so that, for example, a capacitor of the integrating circuit is charged to set initial output value of the integrating circuit. Thus, the convergence time of the integrating circuit is shortened so that the DC offset of the demodulated base band signal can be corrected at a high speed and with high accuracy.

In addition, the count value of the aforementioned counting means is compared with a reference value in frequency error judging means so that a frequency error of the FSK signal is detected. Then, the output of the frequency error judging means is incremented or decremented in second counting means at predetermined timing so that a count value is updated. In accordance with this count value, an oscillation frequency of a local oscillator is controlled by local oscillation frequency control means. Thus, while the DC offset of the demodulated base band signal is corrected, the frequency control of the local oscillator can be performed on the basis of the result of the correction. It is therefore possible to correct the DC offset of the demodulated base band signal with high precision even if the frequency control is rough in resolution.

DESCRIPTION OF THE PREFERRED EMBODIMENTS

Embodiments of the present invention will be described below with reference to the drawings. A base band signal offset correcting circuit in the embodiments of the present invention is provided for a receiving apparatus of an FSK system (FSK receiving apparatus), and has a function of detecting a DC offset component of a demodulated base band signal and correcting a reference voltage for a signal judging comparator (hereinafter referred to as "offset correction").

First Embodiment

Figure 1:
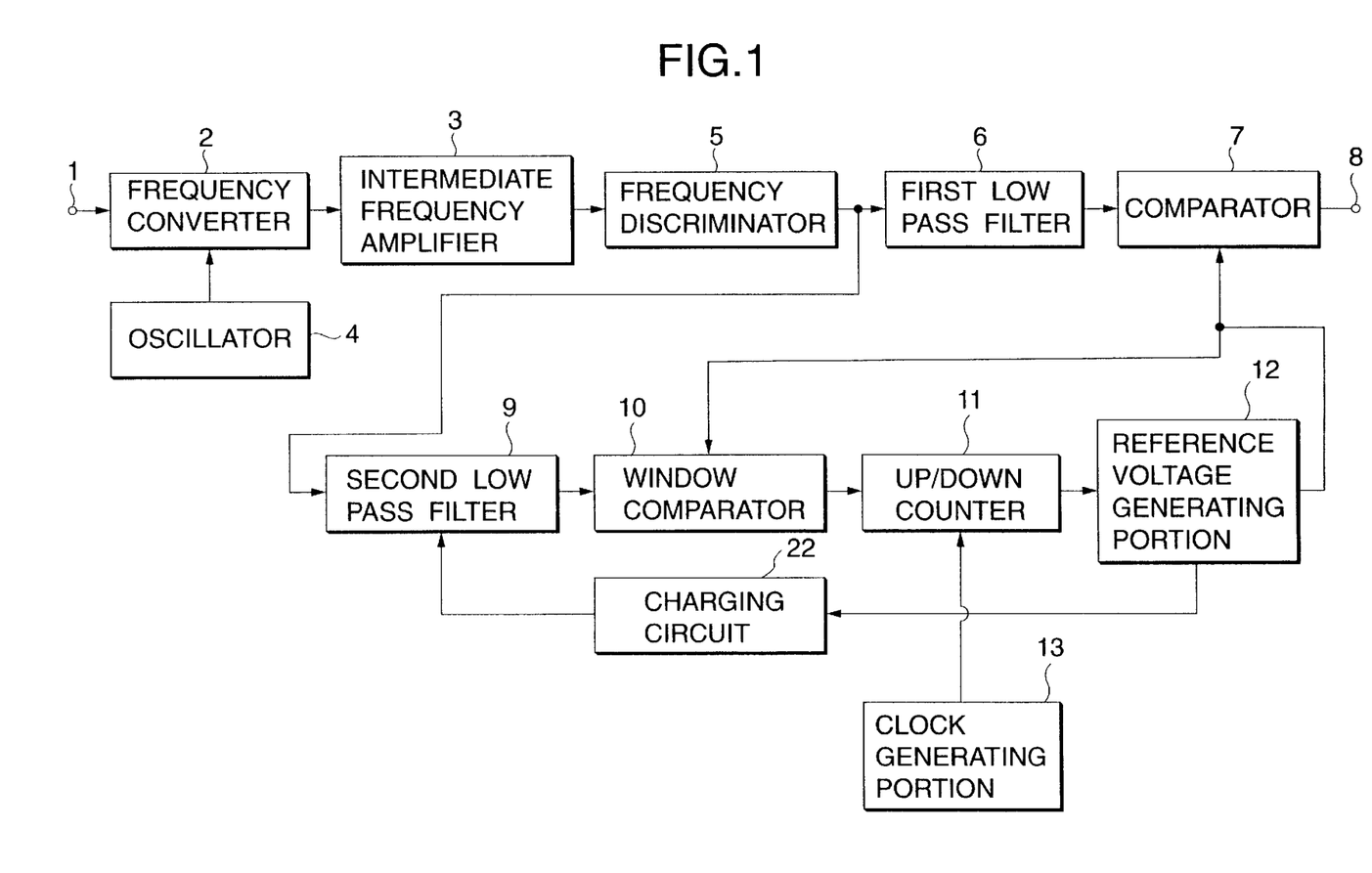
FIG. 1 is a block diagram showing the configuration of a receiving portion having a base band signal offset correcting circuit in a first embodiment of the present invention.
Figure 2:
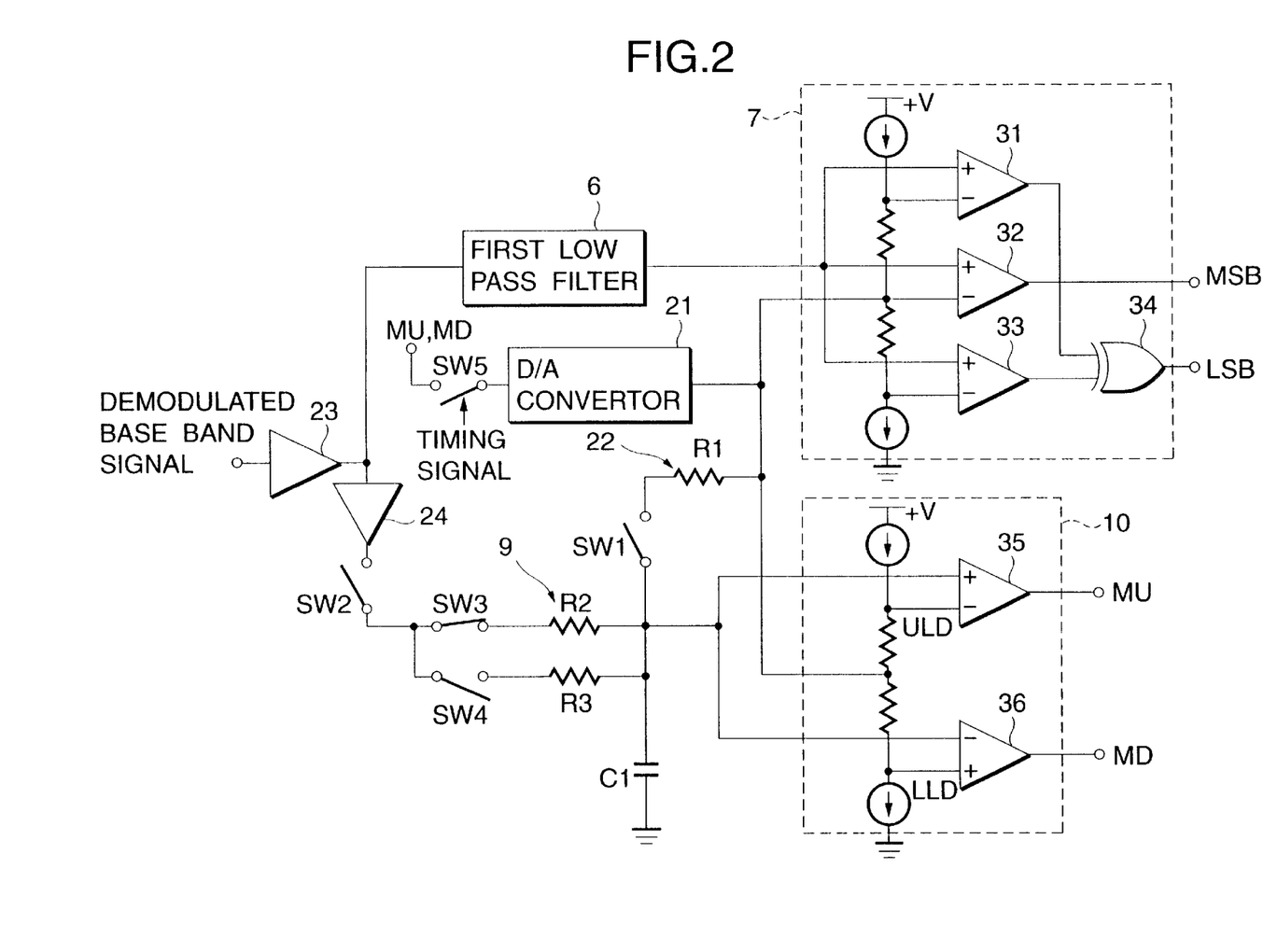
FIG. 2 is a circuit diagram showing the detailed configuration of a main portion of the correcting circuit in this embodiment.
Figure 3:
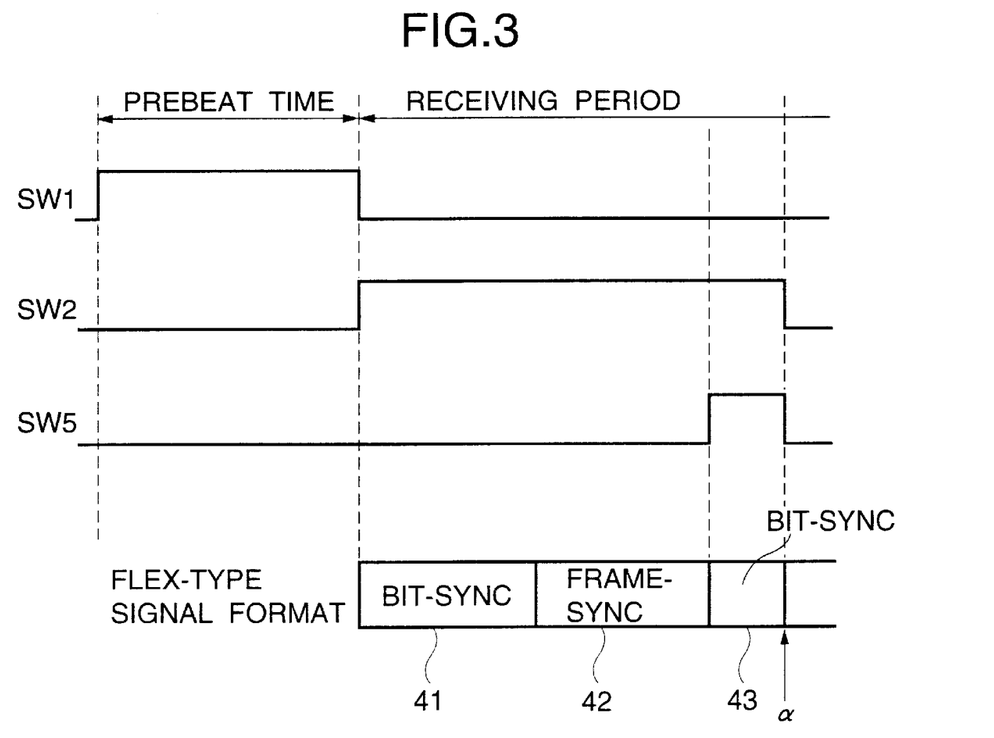
FIG. 3 is a time chart for explaining offset correction operation in the correcting circuit in this embodiment.
Figure 4:
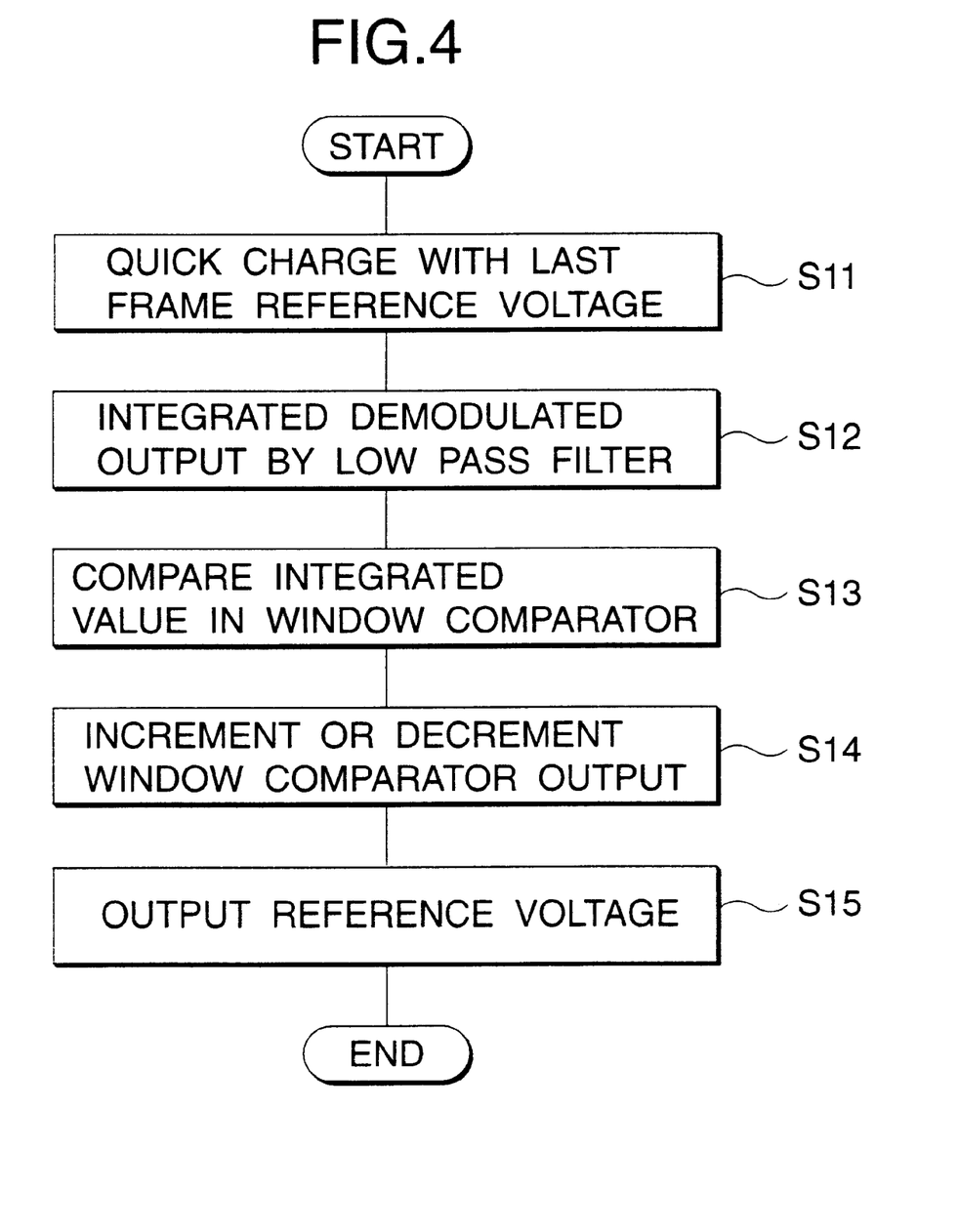
FIG. 4 is a flow chart showing the procedure of the offset correction operation.

FIG. 1 is a block diagram showing the arrangement of a receiving portion having a base band signal offset correcting circuit according to a first embodiment of the present invention; FIG. 2 is a circuit diagram showing the detailed arrangement of a main portion of the correcting circuit in this embodiment; FIG. 3 is a time chart for explaining offset correction operation in the correcting circuit in this embodiment; and FIG. 4 is a flow chart showing the procedure of the offset correction operation.

A receiving portion of an FSK receiving apparatus according to this embodiment is constituted by: a frequency converter 2 for converting an FSK signal in a radio frequency band into an intermediate frequency band; an oscillator 4 for outputting a local oscillation frequency (reference frequency in the intermediate frequency band) for frequency conversion as a local oscillator; an intermediate frequency amplifier 3 for amplifying the FSK signal in the intermediate frequency band; a frequency discriminator 5 for demodulating the FSK signal; a first low pass filter 6 for eliminating a noise component from the demodulated base band signal; and a comparator 7 for comparing the demodulated base band signal with a reference voltage to thereby perform signal judgement so as to obtain a demodulated digital signal. In addition, as means for performing offset correction upon the demodulated base band signal, there are provided a second low pass filter 9 as the integrating circuit for integrating the demodulated base band signal; a window comparator 10 corresponding to the offset detecting means for detecting a DC offset component in the output voltage of the second low pass filter 9; an up/down counter 11 corresponding to the counting means for incrementing or decrementing a count value in accordance with the output of the window comparator 10; a clock generating portion 13 for generating a timing signal for the counting operation in the up/down counter 11; a reference voltage generating portion 12 corresponding to the reference voltage generating means for generating a reference voltage for the comparator 7 in accordance with the output of the up/down counter 11; and a charging circuit 22 corresponding to the initial integral value setting means for supplying a reference voltage generated the last time to the second low pass filter 9 so as to charge it.

The carrier frequency of an FSK signal received through a not-shown antenna and supplied to an input terminal 1 is converted into the intermediate frequency by the frequency converter 2. Then, the FSK signal is amplified to a demodulatable level by the intermediate frequency amplifier 3, and then FM-demodulated into a demodulated base band signal by the frequency discriminator 5. A noise component is eliminated from the demodulated base band signal by the first low pass filter 6. Then, the demodulated base band signal is subjected to signal judgement in the comparator 7 on the basis of a reference voltage so that the demodulated base band signal is outputted from an output terminal 8 as a digital signal.

In this embodiment, a DC offset component of the demodulated base band signal is detected. This DC offset component is added to or subtracted from the reference voltage in the comparator 7 so as to correct the reference voltage. Thus, the demodulation characteristic is improved. In this case, the demodulated base band signal is integrated through the second low pass filter 9, and its average voltage, that is, the sum of an output bias voltage of the frequency discriminator 5 and the DC offset component is detected. Then, the output of the second low pass filter 9 is supplied to the window comparator 10 and judgement is made as to whether the DC offset component is or not over a predetermined range.

When the output voltage of the second low pass filter 9 becomes not less than an upper level discriminator (hereinafter referred to as "ULD") of the window comparator 10, the count value of the up/down counter 11 is incremented. On the contrary, when the output voltage of the second low pass filter 9 becomes not more than a lower level discriminator (hereinafter referred to as "LLD") of the window comparator 10, the count value in the up/down counter 11 is decremented.

Then, in the reference voltage generating portion 12, the output voltage thereof is changed in proportion to the count value of the up/down counter 11, and supplied to the comparator 7 as a reference voltage. This reference voltage is also supplied to the window comparator 10 so that the ULD and the LLD are shifted in accordance with the change of the reference voltage. As a result, correction is applied to the DC offset of the demodulated base band signal.

Next, the detailed configuration and operation of the base band signal offset correcting circuit will be described with reference to FIGS. 2 to 4. In the configuration of FIG. 2, a D/A converter 21 has the functions of the above-mentioned up/down counter 11 and the reference voltage generating portion 12. Incidentally, constituent parts the same as those in FIG. 1 are referenced correspondingly.

The second low pass filter 9 is constituted by resistors R2 and R3, a capacitor C1, and switches SW3 and SW4. In this example, the resistors R2 and R3 which are different in their resistant values from each other are provided in parallel with the capacitor C1 so that the time constant of the second low pass filter 9 can be changed by switching the ON-OFF of the switches SW3 and SW4. In addition, a resistor R1 and a switch SW1 are connected between an output terminal of the D/A converter 21 and the capacitor C1 so as to constitute a charging circuit 22 for charging the capacitor C1 rapidly with the output voltage of the D/A converter 21 (that is, the reference voltage for the comparator 7). This charging circuit 22 has a function of setting an initial output value of the second low pass filter 9 by rapidly charging the capacitor C1 with the reference voltage for the comparator 7. Incidentally, it is assumed that the resistant values of the resistors R1, R2 and R3 are set in the relation R2>R3>R1.

The example of FIG. 2 shows a configuration of a four-valued FSK receiving apparatus. The comparator 7 is provided with three comparators 31 to 33 and a logic circuit (EX-OR (exclusive OR) circuit) 34, and configured so as to carry out signal judgement with three threshold values based on the above-mentioned reference voltage to thereby obtain a four-valued digital signal. "0 (low level)" or "1 (high level)" is set in each of MSB (most significant bit) and LSB (least significant bit) as the output of the comparator 7. In addition, the window comparator 10 is provided with two comparators 35 and 36, and configured to judge whether the output voltage of the second low pass filter 9 is or not over a predetermined range between the ULD and the LLD. As the output of the window comparator 10, "1" is set in an output MU when the output voltage of the second low pass filter 9 is not less than the ULD, "1" is set in an output MD when the output voltage is not more than the LLD, and "0" is set in both the outputs MU and MD in other cases, that is, when the output voltage is within the predetermined range.

The demodulated base band signal produced from the frequency discriminator 5 is supplied to the first low pass filter 6 through a buffer 23 so that a noise component is removed from the demodulated base band signal. Then, the demodulated base band signal is supplied to the comparator 7. In the comparator 7, signal judgement is performed, and a four-valued digital signal is produced. In addition, the demodulated base band signal is supplied to the second low pass filter through buffers 23 and 24. Incidentally, the correcting circuit in this embodiment operates to perform offset correction upon demodulated base band signals for every unit (hereinafter referred to as "frame") of transmitted signals.

As shown in FIG. 3, at the start of a frame, the switch SW 1 is ON (closed) and the switch SW2 is OFF (open). Thus, the capacitor C1 is charged with the output of the D/A converter 21 (reference voltage for the comparator 7 corrected in the last frame) by the charging circuit 22 (Step S11 in FIG. 4). The charging period of time represents a preheating time till the receiving portion runs. As soon as charging is completed, receiving operation using the reference voltage in the last frame becomes ready.

Then, the switch SW1 is turned OFF and the switch SW2 is turned ON so that a demodulated base band signal is supplied to the capacitor C1 in accordance with the time constant of the second low pass filter 9 (through the resistor R2 in the state of FIG. 2), and the demodulated base band signal is integrated (Step S12). If the time constant of the integrating circuit constituted by the second low pass filter 9 is made much larger than the transmission rate of an FSK signal, an average voltage of the demodulated base band signal, that is, the sum of the output bias voltage of the frequency discriminator 5 and a DC offset component of the demodulated base band signal can be detected.

An integral value of the demodulated base band signal is supplied to the window comparator 10, and compared with ULD and LLD (Step S13). The ULD and LLD are established in accordance with the reference voltage for the comparator 7 in the last frame so as to take a voltage value offset up and down by a predetermined amount relatively to the reference voltage respectively. This offset amount of the ULD and LLD from the reference voltage is set to be not larger than an allowable DC offset amount with which the demodulation characteristic is prevented from deteriorating even without correcting the reference voltage.

In the window comparator 10, "1" is set in the output MU when the integrated value of the demodulated base band signal is not less than the ULD, and "1" is set in the output MD when the integrated value is not more than the LLD. As shown in FIG. 3, after a predetermined time has passed since the switch SW2 was turned ON, a switch SW5 is turned ON in response to a timing signal from the clock generating portion 13 so that the outputs MU and MD from the window comparator 10 are supplied to the D/A converter 21. In the D/A converter 21, the count value of a built-in counter is incremented or decremented in accordance with the values of the outputs MU and MD (Step S14). This count value is converted into an analog voltage and supplied to the comparator 7 and the window comparator 10 as a reference voltage (Step S15). Thus, the reference voltage changes in accordance with the output of the window comparator 10 so that offset correction is performed upon the demodulated base band signal.

In the time chart of FIG. 3, an actual receiving operation commences and a receiving period of time starts from the point of time when the switch SW2 is turned ON and the integration of the demodulated base band signal starts. For example, in a FLEX-type pager, signal sections for synchronization such as a bit synchronizing section 41, a frame synchronizing section 42 and a bit synchronizing section 43 are provided at the head of a frame. In the early sections 41 and 42 for bit and frame synchronization, the integration of the demodulated base band signal by the second low pass filter 9 is completed and a DC offset component is detected. In the next bit synchronizing section 43, the DC offset is corrected, and a corrected reference voltage is delivered to the outside.

Thus, the correction of the reference voltage of the comparator 7 can commence after the integration of the demodulated base band signal by the second low pass filter 9 has been completed, while receiving operation can be performed with the last (last frame) reference voltage before completion of the integration. Since synchronizing signals received in the bit synchronizing section 41 and so forth before the offset correction has been completed are generally binary, there is no fear that those signals affect the demodulation performance even if they have some DC offset. Further, if the time constant of the second low pass filter 9 is increased sufficiently, the DC offset component is detected with high precision so that the reference voltage can be corrected. Even when a multi-valued FSK signal is received, its demodulated base band signal can be judged with high precision on the basis of the reference voltage subjected to the offset correction, so that the demodulation performance can be prevented from deteriorating.

Further, in this embodiment, there is a function of rapidly charging the capacitor C1 of the second low pass filter 9 with the reference voltage for the comparator 7 by the charging circuit 22. Since the carrier frequency error on the transmission side, the frequency error of a frequency converting local oscillator on the reception side, and so on, are not generated suddenly, there is a small difference between DC offsets of demodulated base band signals in the last frame and this frame. As mentioned above, the capacitor C1 is charged with the reference voltage in the last frame so as to form an output voltage of the second low pass filter 9. This results in that an initial integral value from the second low pass filter 9 is set to be a DC offset of a demodulated base band signal in the last frame. Thus, the convergence time of the second low pass filter 9 can be substantially shortened. Accordingly, the offset correction can be executed rapidly enough to thoroughly follow burst reception or the like in TDMA-system communication.

Second Embodiment

Figure 5:
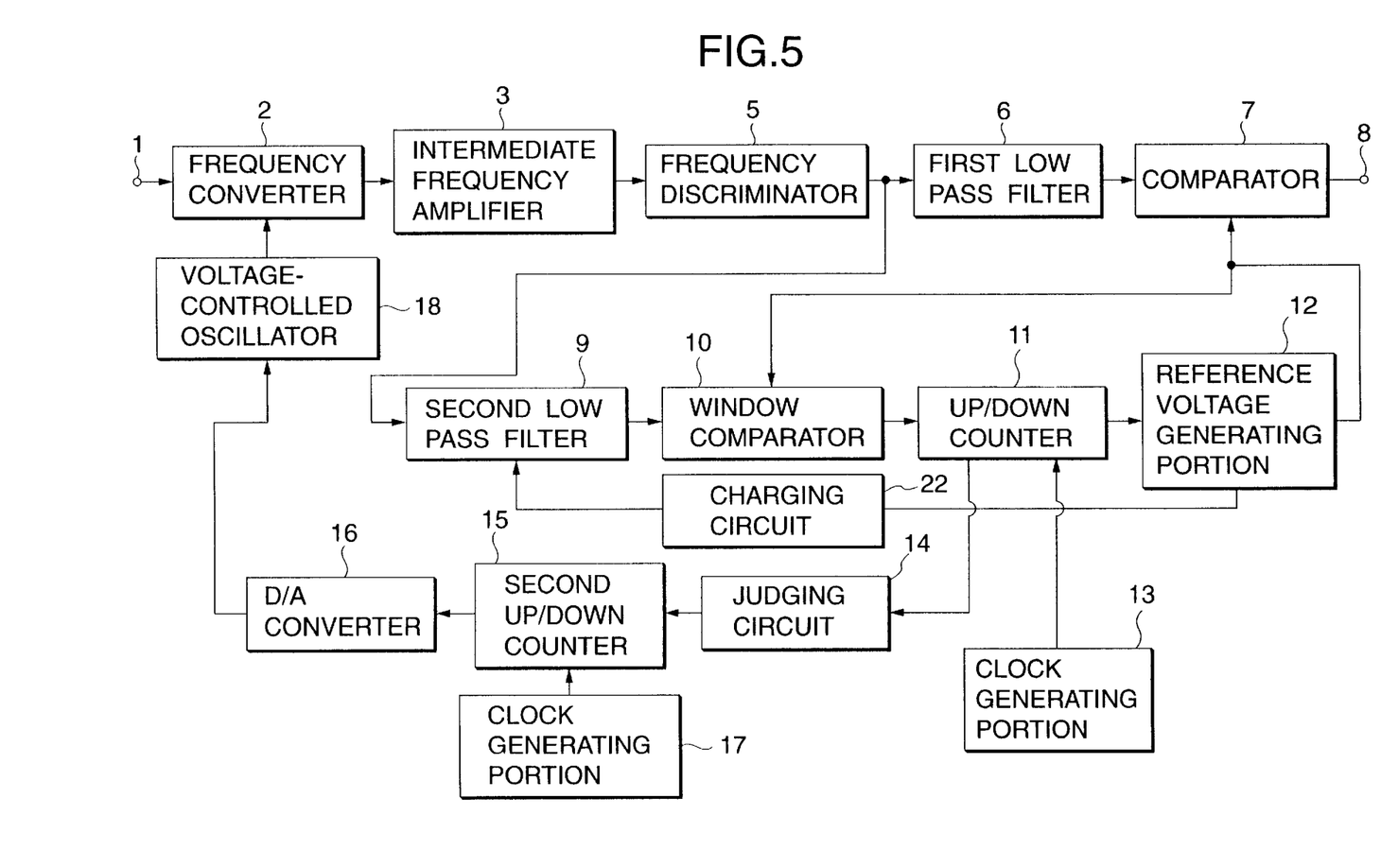
FIG. 5 is a block diagram showing the configuration of a receiving portion having a base band signal offset correcting circuit in a second embodiment of the present invention.
Figure 6:
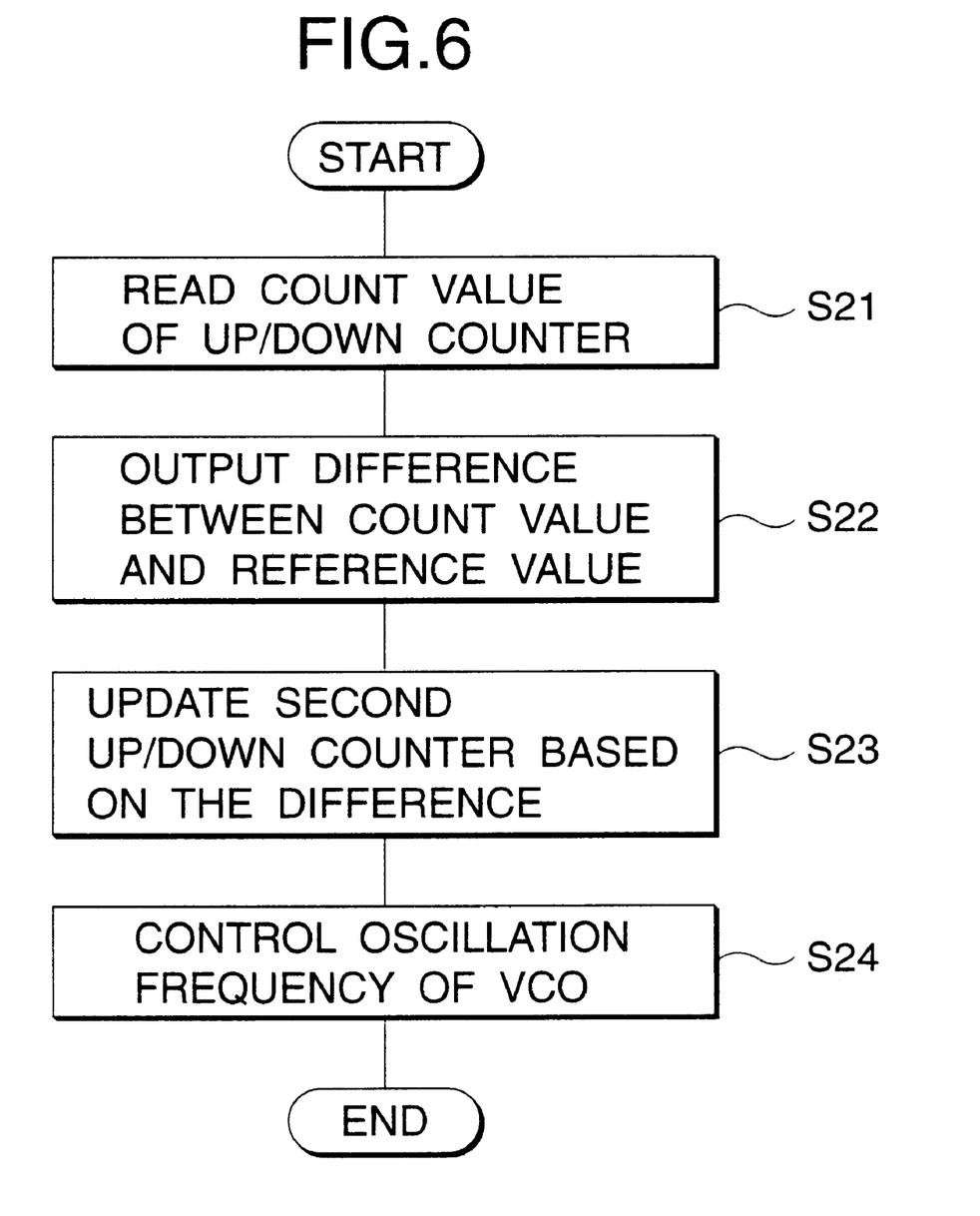
FIG. 6 is a flow chart showing the procedure of frequency control operation.

FIG. 5 is a block diagram showing the configuration of a receiving portion having a base band signal offset correcting circuit according to a second embodiment of the present invention; and FIG. 6 is a flow chart showing the procedure of frequency control operation.

The second embodiment is an example in which automatic frequency control (AFC) means is added to the configuration of the first embodiment. In FIG. 5, constituent parts corresponding to those in the first embodiment shown in FIG. 1 are referenced correspondingly, and description will be made in detail about only different parts.

In the second embodiment, there are further provided: a judging circuit 14 for comparing a count value of an up/down counter 11 with a reference value for the purpose of judgement; a second up/down counter 15 for updating a count value on the basis of the output of the judging circuit 14; a clock generating portion 17 for generating a timing signal for the counting operation in the second up/down counter 15; a D/A converter 16 for converting the output of the second up/down counter 15 into an analog voltage; and a voltage-controlled oscillator (VCO) 18 for outputting a local oscillation frequency while changing the local oscillation frequency in accordance with the output voltage from the D/A converter 16.

In the FSK receiving apparatus, when it is necessary to correct a carrier frequency error on the transmission side and a frequency error of a frequency converting local oscillator on the reception side because there is no room in the bandwidth of an intermediate frequency band so that an offset amount is over its allowable range only by offset correction in a base band, the local oscillation frequency to be supplied to a frequency converter 2 is controlled in the above-mentioned configuration.

In this case, for example, in a manufacturing process, a count value of the up/down counter 11 when the above-mentioned offset correction is performed in the state where there is no carrier frequency error and no frequency error of the frequency converting local oscillator or in the state where an intermediate-frequency carrier itself has been inputted is stored in a ROM in the judging circuit 14 as a reference value in advance. Thus, a difference between a count value of the up/down counter 11 when offset correction is performed on the basis of a received FSK signal and the reference value stored in the judging circuit 14 represents a carrier frequency error and a frequency error of the frequency converting local oscillator.

Offset correction operation is performed in the same manner as in the first embodiment. In this operation, a count value of the up/down counter 11 is read into the judging circuit 14 (Step S21 in FIG. 6), and compared with the stored reference value. This count value is read, for example, at the timing shown by α in the time chart of FIG. 3 (when the production of the corrected reference voltage has been completed). Then, a difference between the count value and the reference value is obtained in the judging circuit 14, and supplied to the second up/down counter 15 (Step S22).

At this time, the judging circuit 14 supplies the foregoing difference to the second up/down counter 15 for performing frequency control when the difference is over a correctable range based on only offset correction in the base band, that is, over an allowable frequency error in the intermediate frequency band when only offset correction is performed.

The judging circuit 14 may be configured to have a plurality of comparators so as to detect a frequency error amount by using a plurality of threshold values and output a difference between the detected frequency error amount and the reference value. Alternatively, the configuration may be made such that a window comparator is used for judging whether a frequency error is or not over a predetermined range, and the judgement result is supplied to the second up/down counter 15.

Then, in the second up/down counter 15, the count value is updated by increment or decrement in accordance with the above-mentioned difference between the count value and the foregoing reference value in response to a timing signal from the clock generating portion 17 (Step S23). This updated count value is supplied to the D/A converter 16 so as to be converted into an analog voltage, and the thus obtained analog voltage is output as a control voltage for controlling the oscillation frequency of the voltage-controlled oscillator 18 (Step S24). Thus, the local oscillation frequency in the intermediate frequency band to be supplied to the frequency converter 2 is corrected. This frequency control is executed, for example, in a frame following a frame in which a frequency error is detected.

When the oscillation frequency of the foregoing voltage-controlled oscillator 18 is thus controlled, the count value of the up/down counter 11 is controlled to coincide with the reference value so that a function as AFC is obtained. Then, AFC can be performed on the frequency converter 2 while the reference voltage of the comparator 7 is corrected. Therefore, the resolution as the AFC means may be rough.

As a result, the number of bits in the D/A converter 16 can be reduced so that the circuit configuration can be simplified.

As has been described, in this embodiment, the reference voltage of the last frame is supplied to the integrating circuit constituted by the second low pass filter 9 so as to rapidly charge the integrating circuit and set an initial output value of the integrating circuit. Thus, the convergence time of the integrating circuit can be shortened so that offset correction can be executed rapidly while a DC offset component of a demodulated base band signal is detected with high accuracy. Further, the circuit which is constituted by the second low pass filter 9, the charging circuit 22 and the window comparator 10 so as to detect a DC offset component of a demodulated base band signal is provided separately from the circuit which is constituted by the up/down counter 11, the reference voltage generating portion 12 and the clock generating portion so as to generate a reference voltage for the comparator 7 on the basis of the offset detection to thereby perform offset correction. As a result, receiving operation can be carried out while a DC offset error is detected.

In addition, while offset correction is carried out in the base band by use of the demodulated base band signal itself, AFC can be performed upon the frequency converter on the basis of the correction result. As a result, high accurate offset correction can be achieved while a frequency error is corrected by use of AFC means with rough resolution.

As has been described, according to the present invention, a demodulated base band signal is integrated by an integrating circuit, and judgement is made by offset detecting means as to whether an integral value of the demodulated base band signal is or not within a predetermined range to thereby detect a DC offset component of the demodulated base band signal. In counting means, a count value is updated by increment or decrement in accordance with the output of the offset detecting means at predetermined timing. On the basis of the count value, a reference voltage for a comparator for performing signal judgement upon the demodulated base band signal is generated by reference voltage generating means. Then, a reference voltage generated the last time is supplied to the integrating circuit by initial integral value setting means, and set as an initial output value of the integrating circuit. As a result, the convergence time of the integrating circuit can be shortened so that there is obtained an effect that a DC offset component of the demodulated base band signal can be detected easily with high precision and at a high speed, and correction can be achieved at a high speed and with high accuracy.

In addition, the count value in the counting means is compared with a reference value by frequency error judging means so that a frequency error of an FSK signal is detected. In second counting means, a count value is updated by increment or decrement in accordance with the output of the frequency error judging means at predetermined timing. In accordance with the count value, the oscillation frequency of a local oscillator is controlled by local oscillation frequency control means. Thus, while the DC offset of the demodulated base band signal is corrected, the frequency control of the local oscillator can be carried out on the basis of the result of the correction. As a result, the correction of the DC offset of the demodulated base band signal can be achieved with high precision even by frequency control with rough resolution.

What is claimed is:

1. A base band signal offset correcting circuit for correcting a DC offset of a demodulated base band signal which is obtained by demodulating an FSK signal, comprising:

an integrating circuit for integrating said demodulated base band signal;

offset detecting means for judging whether an output of said integrating circuit is or not within a predetermined range to thereby detect a DC offset component of said demodulated base band signal;

counting means for incrementing or decrementing an output of said offset detecting means at predetermined timing to thereby update a count value of said counting means; reference voltage generating means for generating a reference voltage on the basis of said count value, said reference voltage being used in a comparator to perform signal judgement upon said demodulated base band signal;

initial integral value setting means for supplying said reference voltage generated the last time to said integrating circuit to thereby set said reference voltage as an initial output value of said integrating circuit;

frequency error judging means for comparing said count value of said counting means with a reference value to thereby detect a frequency error of said FSK signal;

second counting means for incrementing or decrementing an output of said frequency error judging means at predetermined timing to thereby update a count value of said second counting means; and local oscillation frequency control means for controlling an oscillation frequency of a local oscillator in accordance with said count value of said second counting means.

2. An FSK receiving apparatus with a base band signal offset correcting circuit for correcting a DC offset of a demodulated base band signal which is obtained by demodulating an FSK signal, comprising:

integrating circuit for integrating said demodulated base band signal; offset detecting means for judging whether an output of said integrating circuit is or not within a predetermined range to thereby detect a DC offset component of said demodulated base band signal;

counting means for incrementing or decrementing an output of said offset detecting means at predetermined timing to thereby update a count value of said counting means;

reference voltage generating means for generating a reference voltage on the basis of said count value, said reference voltage being used in a comparator to perform signal judgement upon said demodulated base band signal; and initial integral value setting means for supplying said reference voltage generated the last time to said integrating circuit to thereby set said reference voltage as an initial output value of said integrating circuit;

said base band signal offset correcting circuit comprising:

frequency error judging means for comparing said count value of said counting means with a reference value to thereby detect a frequency error of said FSK signal;

second counting means for incrementing or decrementing an output of said frequency error judging means at predetermined timing to thereby update a count value of said second counting means; and local oscillation frequency control means for controlling an oscillation frequency of a local oscillator in accordance with said count value of said second counting means.

3. A base band signal offset correcting method for correcting a DC offset of a demodulated base band signal which is obtained by demodulating an FSK signal, comprising:

an integrating step for integrating said demodulated base band signal;

an offset detecting step for judging whether an integral value of said demodulated base band signal is or not within a predetermined range to thereby detect a DC offset component of said demodulated base band signal;

a counting step for incrementing or decrementing said DC offset component at predetermined timing to thereby update a count value;

a reference voltage generating step for generating a reference voltage on the basis of said count value, said reference voltage being used in a comparator to perform signal judgement upon said demodulated base band signal;

an initial integral value setting step for supplying said reference voltage generated the last time to an integrating circuit for carrying out said integrating step to thereby set said reference voltage as an initial output value of said integrating circuit;

a frequency error judging step for comparing said count value in said counting step with a reference value to thereby detect a frequency error of said FSK signal;

a second counting step for incrementing or decrementing said detected frequency error at predetermined timing to thereby update a count value; and a local oscillation frequency control step for controlling an oscillation frequency of a local oscillator in accordance with said count value in said second counting step.

* * * * *

UNITED STATES PATENT AND TRADEMARK OFFICE
CERTIFICATE OF CORRECTION

PATENT NO. : 6,633,752 B1 Page 1 of 1
DATED : October 14, 2003
INVENTOR(S) : Atsuhiko Hashigaya

It is certified that error appears in the above-identified patent and that said Letters Patent is hereby corrected as shown below:

Title page,
Item [75], Inventor, please delete "Kanakawa", and insert therefor -- Kanagawa --.
Item [73], Assignee, please delete "Matsushita Electric Industries Co., Ltd.", and insert therefor -- Matsushita Electric Industrial Co., Ltd. --.

Column 1,
Line 45, please delete "itself If", and insert therefor -- itself. If --.

Signed and Sealed this

Fourth Day of May, 2004

JON W. DUDAS
*Acting Director of the United States Patent and Trademark Office*